US011842247B2

(12) United States Patent
Yoshida et al.

(10) Patent No.: US 11,842,247 B2
(45) Date of Patent: Dec. 12, 2023

(54) WIRELESS TAG FOR SENSOR CONTROL, MOBILE OBJECT, AND INSPECTION SYSTEM

(71) Applicant: MITSUBISHI HEAVY INDUSTRIES, LTD., Tokyo (JP)

(72) Inventors: Shigeru Yoshida, Tokyo (JP); Masaki Honda, Tokyo (JP); Gen Sakashita, Tokyo (JP); Ryo Hashimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/795,998

(22) PCT Filed: Jan. 6, 2021

(86) PCT No.: PCT/JP2021/000212
§ 371 (c)(1),
(2) Date: Jul. 28, 2022

(87) PCT Pub. No.: WO2021/161686
PCT Pub. Date: Aug. 19, 2021

(65) Prior Publication Data
US 2023/0080305 A1 Mar. 16, 2023

(30) Foreign Application Priority Data
Feb. 13, 2020 (JP) .................. 2020-022013

(51) Int. Cl.
*G06K 7/10* (2006.01)
*H02J 50/00* (2016.01)
(Continued)

(52) U.S. Cl.
CPC ....... *G06K 7/10366* (2013.01); *G01M 99/005* (2013.01); *G05D 1/028* (2013.01);
(Continued)

(58) Field of Classification Search
CPC .......... G06K 7/10366; G06K 19/0708; G06K 19/0723; G06K 7/10376; G06K 19/0701;
(Continued)

(56) References Cited

U.S. PATENT DOCUMENTS

2007/0018819 A1* 1/2007 Streeb .................. G06K 7/0008
340/572.1
2008/0204240 A1 8/2008 Hilgers et al.
(Continued)

FOREIGN PATENT DOCUMENTS

JP 6-198586 A 7/1994
JP 2000-306188 A 11/2000
(Continued)

OTHER PUBLICATIONS

International Preliminary Report on Patentability and Written Opinion of the International Searching Authority for International Application No. PCT/JP2021/000212, dated Aug. 25, 2022, with a English translation.
(Continued)

*Primary Examiner* — Tuyen K Vo
(74) *Attorney, Agent, or Firm* — Birch, Stewart, Kolasch & Birch, LLP (57) ABSTRACT

A wireless tag for sensor control is connected to a sensor and configured to control execution of measurements using the sensor. The wireless tag for sensor control includes: an antenna for receiving a radio wave or a magnetic field transmitted from an external wireless device; a power generation unit configured to generate electric power based on the radio wave or the magnetic field received by the antenna; and a control unit configured to control the sensor using generated power, which is the electric power supplied from the power generation unit, wherein the control unit includes: a power supply control unit configured to use a portion of the
(Continued)

generated power to execute power supply to the sensor; an acquisition unit configured to receive a detection result from the sensor operated by the execution of the power supply; and a transmission processing unit configured to transmit communication information including the detection result to the outside.

9 Claims, 6 Drawing Sheets

(51) Int. Cl.
*G06K 19/07* (2006.01)
*G01M 99/00* (2011.01)
*G05D 1/02* (2020.01)

(52) U.S. Cl.
CPC ..... *G06K 19/0708* (2013.01); *G06K 19/0723* (2013.01); *H02J 50/001* (2020.01); *G05D 2201/0207* (2013.01)

(58) Field of Classification Search
CPC . G06K 19/0712; G01M 99/005; G05D 1/028; G05D 2201/0207; G05D 1/0261; H02J 50/001; H02J 7/00; H02J 50/10; H02J 50/20; H02J 50/80; G08C 17/00; G08C 19/00; H04B 1/59; H04B 5/02
See application file for complete search history.

(56) References Cited

U.S. PATENT DOCUMENTS

2010/0238977 A1    9/2010  Bulled et al.
2017/0270323 A1*   9/2017  Butler .............. G06K 19/07749

FOREIGN PATENT DOCUMENTS

| JP | 2006-72612 A | 3/2006 |
| JP | 3764713 B2 | 4/2006 |
| JP | 2008-529120 A | 7/2008 |
| JP | 2010-169422 A | 8/2010 |
| JP | 5224871 B2 | 7/2013 |
| JP | 5584130 B2 | 9/2014 |
| WO | WO 2007/009475 A1 | 1/2007 |

OTHER PUBLICATIONS

International Search Report for International Application No. PCT/JP2021/000212, dated Apr. 6, 2021.

* cited by examiner

WIRELESS TAG FOR SENSOR CONTROL, MOBILE OBJECT, AND INSPECTION SYSTEM

TECHNICAL FIELD

The present disclosure relates to control of execution of measurements using a sensor.

This application claims priority based on Japanese Patent Application No. 2020-022013 filed on Feb. 13, 2020, the contents of which are incorporated herein by reference.

BACKGROUND

For example, patrol inspection of a plant such as a thermal power plant includes various operations such as palpation operations, reading operations of a meter such as an analog meter, abnormal noise detection, and steam leakage checking. These operations may need to be performed in shifts several times each day, and if they are performed by patrol staff (persons), there are problems such as an increase in inspection costs and a shortage of workers. For this reason, conventionally, instead of patrol staff, a method of inspecting the presence or absence of abnormalities in plant facilities using a remote-controlled mobile trolley equipped with sensors for inspection and monitoring has been proposed. For example, Patent Document 1 discloses a mobile robot that is equipped with a plurality of types of sensors for inspection and monitoring, a battery, and a wireless transmitter, and moves to an inspection target by remote control for inspection. Further, Patent Document 2 discloses a bipedal walking-type or vehicle-type maintenance and inspection robot that reads information of an IC tag arranged along a maintenance and inspection operation route of a plant and acts according to an operation instruction obtained by the information. In recent years, the development of patrol inspection robots has progressed, and patrol inspections by robots are being realized.

Further, Patent Document 3 discloses a system including a fixed sensor terminal that is fixedly installed in a factory or the like and measures environmental information such as temperature, humidity, and illuminance, and a self-propelled sensor terminal for measuring the above-mentioned environmental information and the environmental information of the environment that the fixed sensor terminal cannot measure by moving in space. As a result, by installing the fixed sensor terminal at a position where it is required to perform measurement at a higher time cycle than other measurement points and measuring the measurement points that do not require a high time cycle using the self-propelled sensor terminal, it will be possible to efficiently measure the environment with a small number of terminals without installing fixed sensors at all positions.

CITATION LIST

Patent Literature

Patent Document 1: JPH 6-198586 B
Patent Document 2: JP 3764713 B1
Patent Document 3: JP 2010-169422 A

SUMMARY

Technical Problem

However, when the patrol inspection is replaced with a ground-traveling robot as in Patent Literatures 1 and 2, the following problems exist. That is, it is difficult to inspect a position such as a high place or the upper surface of piping that cannot be reached by a ground-traveling robot or becomes a blind spot. When the palpation operation is replaced with a robot, it is necessary to install a high-performance manipulator, which increases the cost of the robot and limits the range that can be inspected by the manipulator. When the meter reading operation is replaced with a robot, it is necessary to take a picture of the meter with a camera mounted on the robot, but accurate alignment of the robot and the camera is required, and control of these is not easy. In addition, when the inspection points are identified based on the position information of the robot and the inspection points and the inspection results are linked and managed, if a plurality of inspection points are close to each other (see FIG. 1), there is a risk of misidentifying the inspection point for the inspection result depending on the position estimation accuracy of the robot.

It is conceivable to apply wireless communication technology to such problems as in Patent Document 3, but for fixed sensors, it is necessary to install power supply facilities such as laying of power cables, which will increase the cost significantly. It is conceivable to use a battery (for example, a built-in battery) instead of this power cable to drive a fixed sensor, but when the battery is exhausted, it needs to be replaced, which increases the maintenance cost.

In view of the above-mentioned circumstances, an object of at least one embodiment of the present invention is to provide a wireless tag for sensor control capable of efficiently inspecting a target area such as a plant at a low cost.

Solution to Problem

A wireless tag for sensor control according to at least one embodiment of the present invention is a wireless tag for sensor control that is connected to a sensor and configured to control execution of measurements using the sensor, including: an antenna for receiving a radio wave or a magnetic field transmitted from an external wireless device; a power generation unit configured to generate electric power based on the radio wave or the magnetic field received by the antenna; and a control unit configured to control the sensor using generated power, which is the electric power supplied from the power generation unit, wherein the control unit includes: a power supply control unit configured to use a portion of the generated power to execute power supply to the sensor; an acquisition unit configured to receive a detection result from the sensor operated by the execution of the power supply; and a transmission processing unit configured to transmit communication information including the detection result to the outside.

An inspection system according to at least one embodiment of the present invention includes: one or more wireless tags for sensor control; an external wireless device for transmitting a radio wave or a magnetic field to the one or more wireless tags for sensor control and receiving communication information transmitted from the one or more wireless tags for sensor control; and a mobile object equipped with the external wireless device.

A mobile object according to at least one embodiment of the present invention is equipped with an external wireless device for transmitting a radio wave or a magnetic field to the wireless tag for sensor control and receiving communication information transmitted from the wireless tag for sensor control.

Advantageous Effects

According to at least one embodiment of the present invention, there is provided a wireless tag for sensor control capable of efficiently inspecting a target area such as a plant at a low cost.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

In the present specification, an expression of relative or absolute arrangement such as "in a direction", "along a direction", "parallel", "orthogonal", "centered", "concentric", and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

For example, an expression of a shape such as a rectangular shape or a cylindrical shape shall not be construed as only the geometrically strict shape, but also includes a shape with unevenness or chamfered corners within the range in which the same effect can be achieved.

Furthermore, an expression such as "comprise", "include", "have", "contain", and "constitute" are not intended to be exclusive of other components.

(Description of Inspection System)

Figure 1:
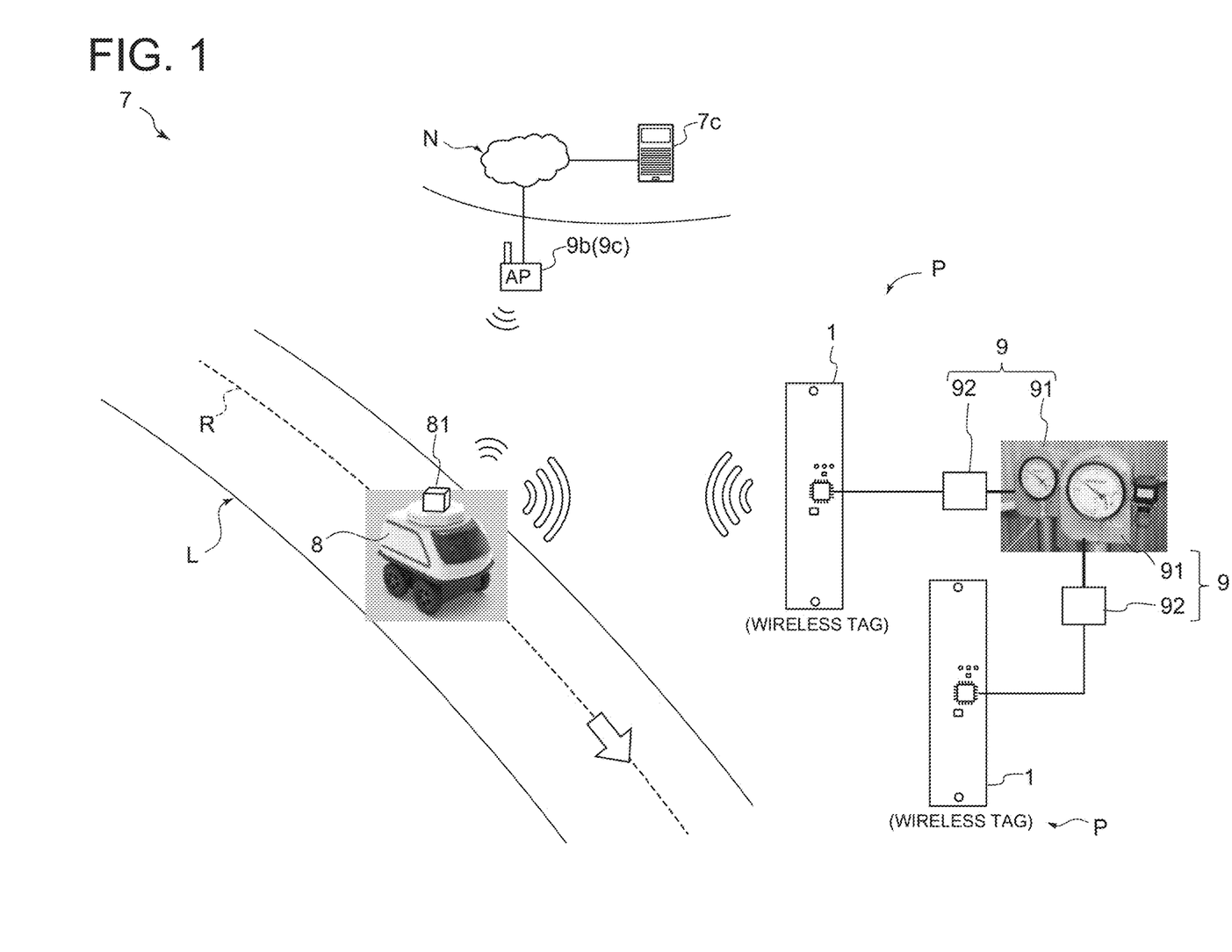
FIG. 1 is a diagram schematically showing a configuration of an inspection system according to an embodiment of the present invention.

FIG. 1 is a diagram schematically showing a configuration of an inspection system 7 according to an embodiment of the present invention.

As shown in FIG. 1, the inspection system 7 is a system for performing inspection (patrol inspection) in an arbitrary area (hereinafter referred to as a target area) defined as a target for maintenance and inspection of, for example, a plant. Then, the inspection system 7 includes one or more wireless tags for sensor control installed in at least one place in the target area, a mobile object 8 capable of communicating with the wireless tag for sensor control while moving in the target area, and a control device 7c configured to communicate with the mobile object 8 wirelessly connected to a base station 9b such as a WiFi (wireless LAN) or a mobile object communication system (4G, 5G, and the like).

The wireless tag for sensor control (hereinafter, simply wireless tag 1) is a device connected to sensors 9 installed in the target area and configured to control the execution of measurement using the sensor 9. The sensors 9 are various measuring instruments capable of detecting (measuring) a desired physical quantity, and may be meters such as an analog meter or cameras. The sensors 9 are installed at necessary places in the plant in order to obtain physical quantities such as temperature, vibration, flow rate, and abnormal noise of a target facility such as piping. For example, if the sensor 9 is an analog meter (see FIG. 1), a converter 92 capable of outputting a value corresponding to the detected analog value is connected to a sensor main body 91, and the sensor 9 can output the detection result (measurement result) to the outside as digital information. A camera (sensor 9) may be installed in the vicinity in order to photograph the meter portion of the analog meter. Normally, a plurality of sensors 9 are installed in the plant, and the wireless tag 1 is provided for each sensor 9 by, for example, being attached to the housing of each sensor 9 or a facility in the vicinity thereof. The details of the wireless tag 1 will be described later.

Further, the mobile object 8 is configured to move along a patrol route R determined to sequentially follow (patrol) one or more inspection points P (sensors 9) existing in the target area, with the installation place of each of the sensors 9 as the inspection point P. The mobile object 8 may be a ground-traveling maintenance and inspection robot such as an automated guided vehicle (AGV) as shown in FIG. 1, or may be a flight-type maintenance and inspection robot such as an unmanned aerial vehicle (UAV) called a drone. Alternatively, the mobile object 8 may be a person or a vehicle carrying a person.

Specifically, in some embodiments, the mobile object 8 may be configured to automatically move along the patrol route R based on map information that allows the patrol route R to be grasped, and the current position of the mobile object 8 obtained using a self-position estimation means mounted on the mobile object 8. This self-position estimation means may be a well-known means. For example, it may be a global navigation satellite system (GNSS), an autonomous navigation device based on the direction and distance detected by a sensor mounted on the mobile object 8, or a light detecting and ranging (LiDAR). In some other embodiments, the mobile object 8 may be configured to be remotely controlled by an operator or the like. In this case, since a camera or LiDAR is mounted on the mobile object 8, the surrounding situation is transmitted to the control device 7c or the like, and the operator may manually operate the mobile object 8, for example, by instructing the traveling direction and speed of the mobile object 8 while watching the surrounding situation through a monitor at a remote site and referring to the above-mentioned current position and the map information. In some other embodiments, the above-described embodiments may be combined and switched. The above-mentioned map information may be generated by moving the mobile object 8 within the target area by simultaneous localization and mapping (SALM) using LiDAR or the like.

Then, when the mobile object 8 arrives in the vicinity of the sensor 9 while moving along such a patrol route R, an inspection operation is performed. Specifically, the mobile object 8 automatically or manually activates the sensor 9 by performing wireless communication with the wireless tag 1 as described later, and wirelessly transmits the detection result V from the sensor 9 to the mobile object 8 or the outside such as the control device 7*c* or the like.

On the other hand, the control device 7*c* is a computer device for managing information such as inspection results obtained by the inspection operation of the mobile object 8 and controlling the movement of the mobile object 8. This movement control may be performed automatically as described above, or a content command of a movement operation input by the operation of the operator may be transmitted to the mobile object 8.

In the embodiment shown in FIG. 1, the mobile object 8 is an AGV traveling by the electric power of an in-vehicle battery, and is configured so that the current position is periodically transmitted to the control device 7*c*. Further, the control device 7*c* is provided with the above-mentioned map information, and controls the movement of the mobile object 8 while checking whether the received current position follows the patrol route R. Specifically, the control device 7*c* may track the current position of the mobile object 8 that moves toward a transmitted destination after transmitting (commanding) the next destination to the mobile object 8. By repeating this, the mobile object 8 can move along the patrol route R. Further, the mobile object 8 transmits the inspection result acquired at each inspection point P to the control device 7*c*, and the control device 7*c* accumulates the received inspection result.

However, the present invention is not limited to this embodiment. In some other embodiments, the mobile object 8 may store the map information in a storage device mounted on the mobile object 8, or the map information may be arranged on the mobile object 8 side, and the mobile object 8 may move autonomously. In this case, the control device 7*c* may be able to monitor the received current position of the mobile object 8 and switch to remote control if necessary. In some other embodiments, the inspection system 7 may not include the control device 7*c*. In this case, the mobile object 8 may move autonomously, and the mobile object 8 may accumulate (store) all the inspection results, and the inspection results accumulated in a predetermined place such as a hangar (not shown) may be collected by an inspector or the like.

In the inspection system 7 as described above, as shown in FIG. 1, the mobile object 8 includes (is equipped with) an external wireless device 81 for transmitting a radio wave or a magnetic field (hereinafter, a radio wave or the like) to the wireless tag 1 installed at each of one or more inspection points P in the patrol route R and receiving communication information I (inspection result and the like) from each wireless tag 1 in response to the transmission. Specifically, the external wireless device 81 is a device that performs wireless communication with the wireless tag 1 using the communication principle of radio frequency identifier (RFID).

That is, the external wireless device 81 is an RFID reader and writer, and is configured to transmit (output) a radio wave or the like to the wireless tag 1. On the other hand, the wireless tag 1 that executes wireless communication with the external wireless device 81 with the RFID is, for example, an RFID tag (hereinafter, a wireless tag) such as an IC tag, and generates electric power based on the radio wave or the like from the external wireless device 81 received by the antenna 1*a* and operates with the generated electric power (hereinafter, generated power E). Then, the wireless tag 1 is configured to be able to transmit the information obtained as a result of this operation to the outside, for example, by returning the information from the antenna 1*a* to the external wireless device 81. Therefore, in the inspection system 7 configured in this way, the wireless tag 1 will be activated (operated, the same hereinafter) only when the radio wave or the like from the external wireless device 81 moving together with the mobile object 8 is within the receivable range of the wireless tag 1.

Hereinafter, the wireless tag 1 will be described in detail with reference to FIGS. 2 to 4.

Figure 2:
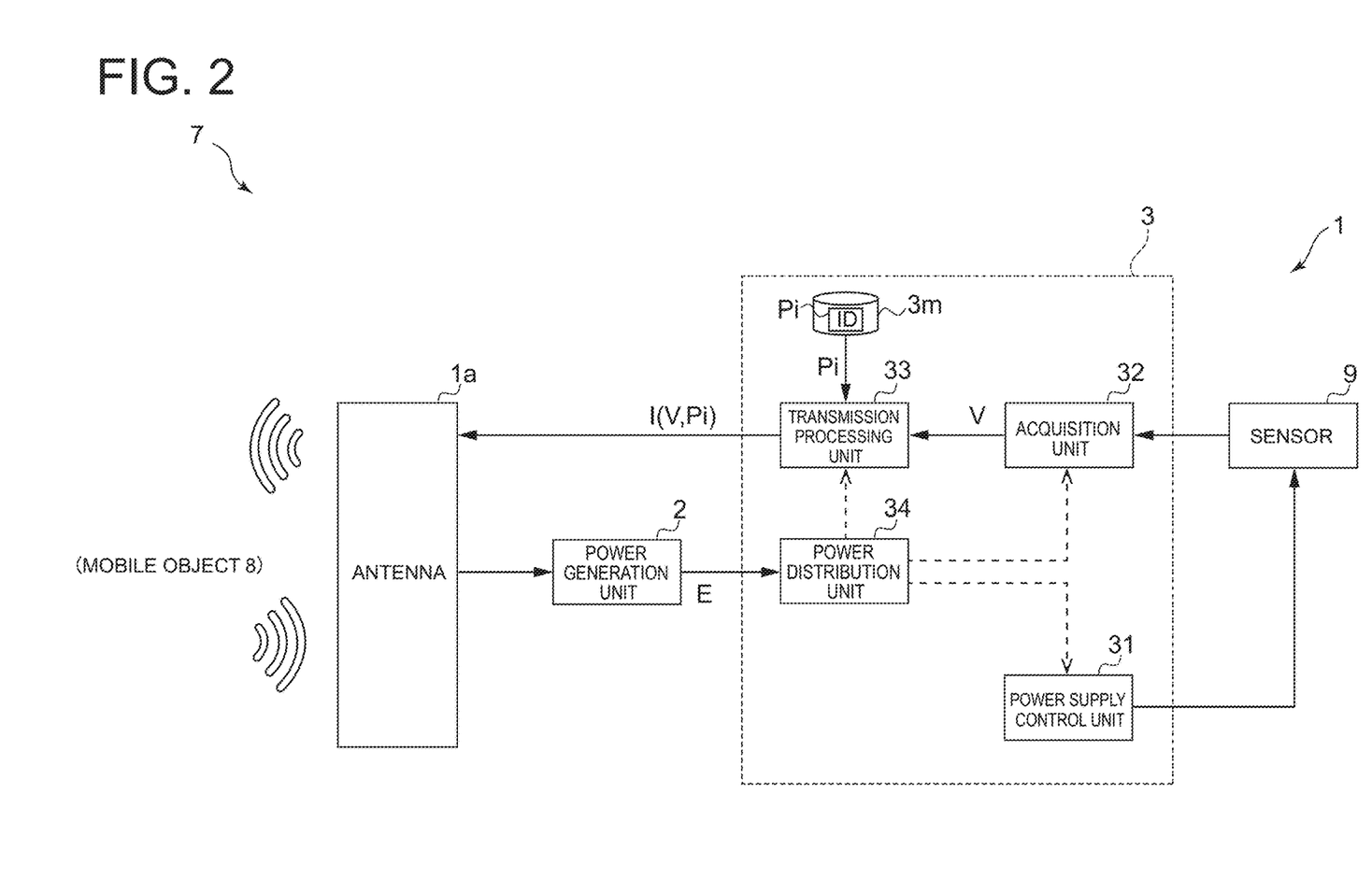
FIG. 2 is a block diagram schematically showing a function of a wireless tag for sensor control according to an embodiment of the present invention.
Figure 3:
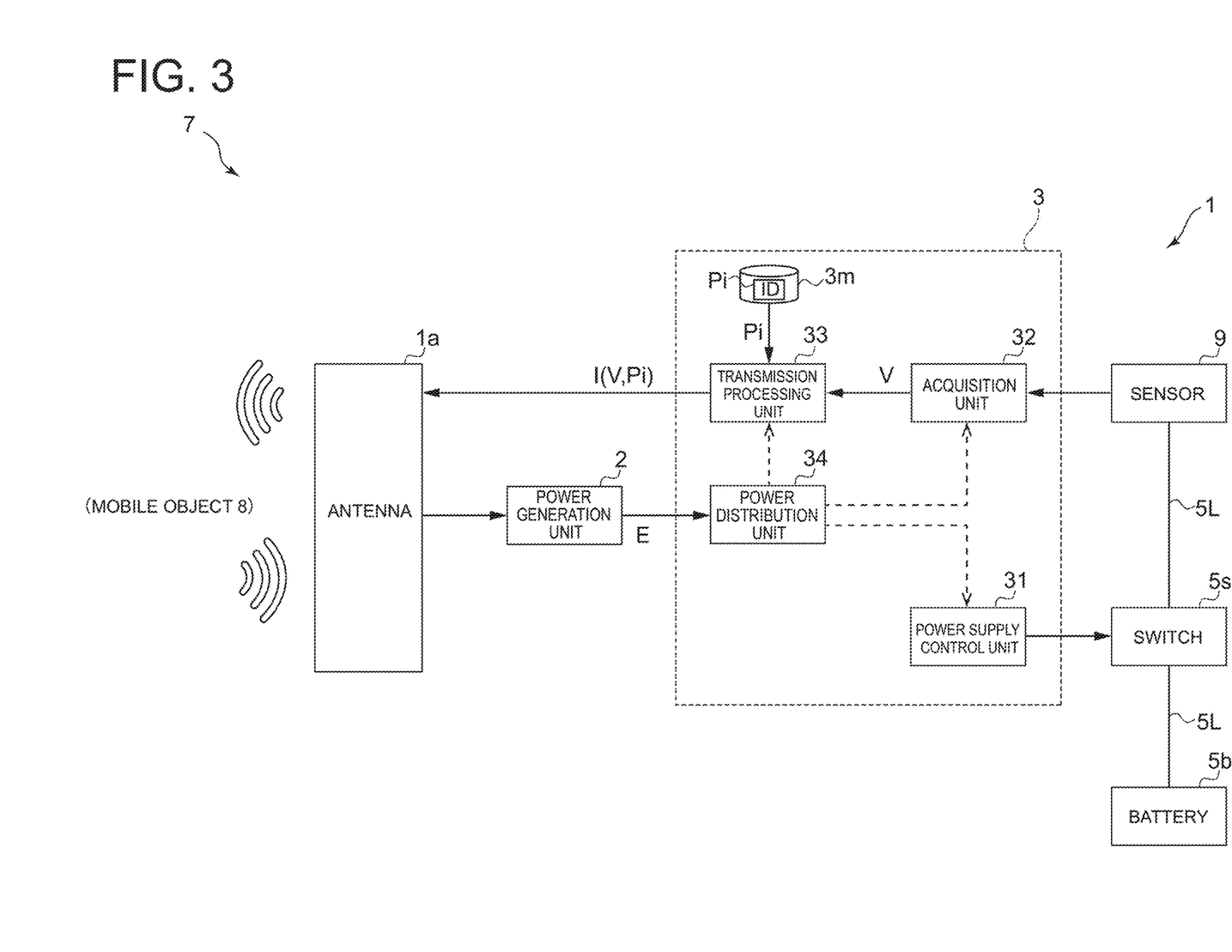
FIG. 3 is a block diagram schematically showing a function of a wireless tag for sensor control according to an embodiment of the present invention, which includes a battery for driving a sensor.
Figure 4:
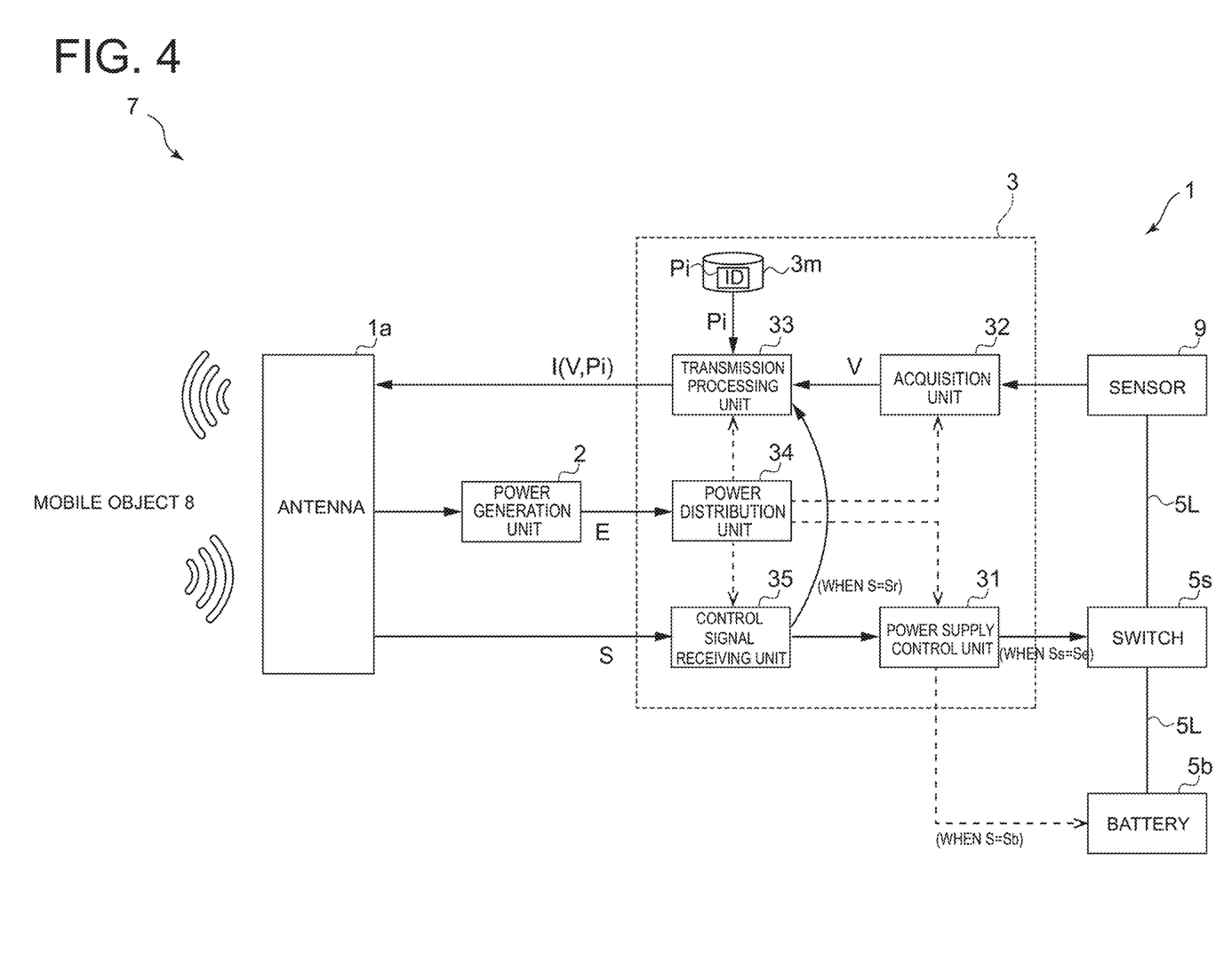
FIG. 4 is a block diagram schematically showing a function of a wireless tag for sensor control according to an embodiment of the present invention, which includes a control signal receiving unit.

FIGS. 2 to 4 are block diagrams schematically showing the functions of the wireless tag 1 according to the embodiment of the present invention. The wireless tag 1 shown in FIGS. 2 to 4 is a wireless tag, and is configured of a circuit unit installed on a substrate (printed circuit board).

As shown in FIGS. 2 to 4, the wireless tag 1 includes an antenna 1*a* for receiving the radio wave or the like transmitted from the above-mentioned external wireless device 81, a power generation unit 2 configured to generate electric power based on the received radio wave or the like, and a control unit 3 configured to control the sensor 9 to which the wireless tag 1 is connected using the generated power E which is the electric power supplied from the power generation unit 2.

The control unit 3 may be configured of a computer. That is, the control unit 3 includes a processor (for example, MPU) (not shown) and a storage unit 3*m* such as ROM or RAM, and the processor operates (calculates) according to the commands of a program (control program) such as firmware loaded in a memory (main storage device), whereby each of the above-mentioned functional units is realized. In other words, the above-mentioned program is software for realizing each functional unit described later in a computer, and may be stored in a storage medium that can be read by the computer.

More specifically, the control unit 3 includes a power supply control unit 31 configured to execute power supply to the sensor 9 using a portion of the generated power E supplied from the power generation unit 2 described above, an acquisition unit 32 configured to receive the detection result V from the sensor 9 that is turned on and activated (operated) by the execution of the power supply, and a transmission processing unit 33 configured to transmit the communication information I including the input detection result V to the outside.

The detection result V of the above-mentioned sensor 9 is a measured value of the sensor 9, and may be data of an instantaneous value of a measurement value of a physical quantity such as temperature, pressure, or vibration, or may be image data such as a thermal image composed of a plurality of measurement values or a data set composed of a predetermined period of measurement values.

Further, in some embodiments, the above-mentioned communication information I may further include the position identification information Pi used to identify the installation position of the sensor 9, as shown in FIGS. 2 to 4. Even if a plurality of wireless tags 1 are installed on the patrol route R, the position identification information Pi may be a tag ID or the like that can uniquely identify them. Alternatively, the position identification information Pi may be coordinate information such as latitude and longitude, or a relative position from a reference position arbitrarily determined in the target area. The position identification information Pi is stored in advance in the storage unit 3m included in the wireless tag 1, so that the position identification information Pi is transmitted together when the transmission processing unit 33 transmits the detection result V of the sensor 9 to the outside. Therefore, since the receiving side such as the mobile object 8 receives the detection result V of each sensor 9 and the position identification information Pi of the sensor 9 as a set, the position identification information Pi with respect to the detection result V is received in a linked form, and it becomes easy to identify which sensor 9 the received detection result V belongs to.

That is, the control unit 3 is activated (in a state where the power is on) by the electric power (generated power E) supplied from the electric power generation unit 2, and operates using a portion of the generated power E. Further, the sensor 9 is activated by receiving the power supply of another portion of the generated power E that is not used for the operation from the control unit 3 that is operated by the supply of the generated power E. Then, the activated sensor 9 detects the physical quantity to be detected, and inputs the detection result V to the acquisition unit 32. In this way, the presence or absence of execution of measurement using the sensor 9 is controlled.

In the embodiment shown in FIGS. 2 to 4, the wireless tag 1 is configured as a passive wireless tag that can operate with only the generated power E such as the radio wave or the like received from the external wireless device 81 without including a built-in battery or an externally installed battery 5b (see FIGS. 3 to 4), for example. Further, the transmission processing unit 33 transmits the above-mentioned communication information I to the above-mentioned external wireless device 81 by RFID using the above-mentioned antenna 1a. At this time, the transmission processing unit 33 includes the tag ID stored in the storage unit 3m in the communication information I, and then transmits the tag ID to the external wireless device 81.

Further, in the embodiment shown in FIGS. 2 to 4, the wireless tag 1 further include a power distribution unit 34 (circuit unit) configured to distribute the generated power E input from the power generation unit 2 to each functional unit (circuit unit) of the control unit 3. The power supply control unit 31, acquisition unit 32, and transmission processing unit 33 described above operate using the electric power supplied from the power distribution unit 34.

However, the present invention is not limited to this embodiment. In some other embodiments, the wireless tag 1 may be an active wireless tag with the battery 5b. Further, in some other embodiments, the transmission processing unit 33 may transmit the communication information I to the outside without performing wireless communication by RFID. For example, the wireless tag 1 may be connected to a wireless device (not shown) capable of wireless communication with a base station 9b such as a WiFi or a mobile object communication system by wire or wirelessly (for example, RFID or near-field communication). The transmission processing unit 33 may output the communication information I to the wireless device (not shown), and the communication information I may be directly communicated to the above-mentioned control device 7c.

The control unit 3 described above may be realized by a micro controller unit (MCU) or the like. Further, for example, the power generation unit 2 and the control unit 3 may be mounted on one integrated circuit (chip) such as a system on chip (SoC). The control unit 3 may be functionally distributed to a plurality of circuits such as a plurality of ICs, and may be mounted as an SoC on the control unit 3.

According to the above-mentioned configuration, the wireless tag 1 generates electric power by receiving the radio wave or the like from the external wireless device 81 such as an RFID tag reader and writer, and execute power supply to the sensor 9 installed in, for example, a plant using a portion of the electric power. Further, the detection result V obtained by the sensor 9 operating with this power supply is acquired, and the communication information I is communicated to a host device (the control device 7c or the like in FIG. 1) via, for example, the above-mentioned external wireless device 81, a wireless LAN, or a base station 9b of a mobile communication system. That is, power is supplied to the sensor 9 using RFID, the sensor 9 is powered on and activated (operated), and the detection result V of the sensor 9 is wirelessly transmitted to the outside.

For example, if such a wireless tag 1 is used together with the mobile object 8 having the external wireless device 81, the above-mentioned operation is performed only when the mobile object 8 is within a range where the wireless tag 1 can receive the radio wave or the like from the external wireless device 81 moving together with the mobile object 8.

In this way, by turning on the power of the wireless tag 1 and the sensor 9 using RFID or the like, the power supply to the wireless tag 1 and the sensor 9 can be performed without installing the battery 5b and the power supply facilities (cable laying, and the like). Therefore, it is possible to reduce these installation costs and maintenance costs such as replacement of the battery 5b.

Further, by wirelessly communicating the detection result V of the sensor 9 from the wireless tag 1 to the outside, it is easy to inspect a position such as a high place or the upper surface of piping that cannot be reached by a ground-traveling robot or becomes a blind spot. In addition, by acquiring the detection result V of the sensor 9 installed in advance by wireless communication, an inspection operation can be performed without using expensive facilities such as a high-performance manipulator or advanced control such as camera alignment. Further, if the position identification information Pi is included in the communication information I transmitted from the wireless tag 1 to the outside together with the detection result V of the sensor 9, the inspection point P and the detection result V of the sensor 9 can be linked more reliably.

Next, some embodiments relating to the above-mentioned wireless tag 1 will be described with reference to FIGS. 3 to 4.

FIG. 3 is a block diagram schematically showing the function of the wireless tag 1 according to the embodiment of the present invention, which includes a battery 5b for driving a sensor. FIG. 4 is a block diagram schematically showing the function of the wireless tag 1 according to the embodiment of the present invention, which includes a control signal receiving unit 35.

In the embodiment described with reference to FIG. 2 described above, the wireless tag 1 is a passive wireless tag, and the wireless tag 1 and the sensor 9 can operate without power supply from the battery 5b or the power supply facilities. However, the following problems can be considered. That is, the generated power E generated by the wireless tag 1 based on the radio wave or the like is usually not so large. Therefore, it is difficult to drive the sensor 9 or the external circuit that consumes power that exceeds the generated power E. Further, even with the sensor 9 having low power consumption, it may be difficult to perform measurement at a high sampling frequency. Therefore, there is a possibility that power will be insufficient for measuring and transmitting data such as vibration (acceleration), distortion, and images such as thermal images. To solve such a problem, for example, if a battery 5b is added to drive the sensor 9, these measurements and transmission to the outside may be possible. However, in this case, the higher the sampling frequency, the faster the consumption of the battery 5b, and it is necessary to replace the battery 5b regularly.

Therefore, in some embodiments, as shown in FIGS. 3 to 4, the above-mentioned sensor 9 is connected to the battery 5b via a switch 5s (relay switch) capable of switching the presence and absence of the power supply to the sensor 9. The power supply control unit 31 described above may be configured to switch on the above-mentioned switch 5s in order to supply the power of the battery 5b to the sensor 9.

That is, the switch 5s is provided on a power line 5L connecting the sensor 9 and the battery 5b. When the switch 5s is switched on, electricity flows through the power line 5L, so that power is supplied from the battery 5b to the sensor 9, and when the switch 5s is switched off, electricity does not flow, so that the supply of power from the battery 5b to the sensor 9 is stopped. That is, except for natural discharge, the electric power from the battery 5b is discharged only when the switch 5s is in the ON state.

In the embodiment shown in FIG. 3, the battery 5b is connected only to the sensor 9, but the battery 5b may be also connected to the wireless tag 1 (power distribution unit 34), so that the wireless tag 1 is configured to operate with the power of the battery 5b. In this case, the wireless tag 1 controls the power supply to the sensor 9 by operating according to a control signal S (start signal Ss, completion signal Se, and the like) described later. Further, in the embodiment shown in FIG. 3, the battery 5b is installed outside the wireless tag 1, but in some other embodiments, the battery 5b may include the battery 5b and the switch 5s. That is, the wireless tag 1 may be an active wireless tag, and may further include the battery 5b and the switch 5s.

According to the above-mentioned configuration, the sensor 9 is activated using the electric power of the battery 5b. Then, the power supply control unit 31 switches on the switch 5s provided on the power line 5L connecting the sensor 9 and the battery 5b using a portion of the electric power generated based on the radio wave or the like received from the external wireless device 81. As a result, the power supply to the sensor 9 can be executed using the battery 5b in response to the wireless tag 1 receiving the radio wave or the like received from the external wireless device 81. As a result, even when the power consumption of the sensor 9 is large or the detection (measurement) with a high sampling frequency is required, the measurement by the sensor 9 can be appropriately executed.

Further, since the electric power stored in the battery 5b is used only when the radio wave or the like is received from the external wireless device 81, it is possible to suppress the consumption of the electric power of the battery 5b and extend the operating time of the battery 5b. At this time, if the wireless tag 1 is completely passively driven, standby power is not required, so that the wireless tag 1 can be operated without using the power of the battery 5b. Therefore, the operating time of the battery 5b can be further extended.

Further, in some embodiments, as shown in FIG. 4, the above-mentioned control unit 3 may be configured to execute processing according to the control signal S obtained based on the radio wave or the magnetic field received from the mobile object 8 or the like. Specifically, when transmitting the radio wave or the like, the external wireless device 81 may superimpose the control signal S on the radio wave or the like (carrier) by modulating and transmitting the radio wave or the like according to the content (command) of the control signal S for giving an instruction (command) to the wireless tag 1. However, other methods may be used, as long as the control signal S can be communicated to the wireless tag 1 by the radio wave or the like transmitted from the external wireless device 81. As a result, it is possible to operate the wireless tag 1 in response to an external command. In the embodiment shown in FIG. 4, the inspection system 7 includes the battery 5b and the switch 5s described above, but they may not be provided.

Specifically, in some embodiments, the above-mentioned control signal S may be a start signal Ss instructing the start of power supply to the sensor 9. For example, as shown in FIG. 4, when the inspection system 7 includes the above-mentioned battery 5b, the power supply control unit 31 may be configured to switch on the above-mentioned switch 5s when the received control signal S is the start signal Ss. As a result, the power supply to the sensor 9 can be executed in response to an external command.

In some other embodiments, the above-mentioned control signal S may be a completion signal Se instructing the stop of power supply to the sensor 9 (completion of measurement). For example, as shown in FIG. 4, when the inspection system 7 includes the above-mentioned battery 5b, the power supply control unit 31 may be configured to switch off the above-mentioned switch 5s when the received control signal S is the completion signal Se. As a result, the power supply to the sensor 9 can be stopped in response to an external command, and the power of the battery 5b can be prevented from being consumed unnecessarily while allowing the wireless tag 1 to continue to operate when the power supply to the sensor 9 is unnecessary.

In some other embodiments, the above-mentioned control signal S may be a charge execution signal Sb instructing the power supply to the battery 5b. In this case, when the inspection system 7 includes the battery 5b described above and the received control signal S is the charge execution signal Sb, the power supply control unit 31 is configured to supply a portion of the generated power E to the battery 5b instead of the power supply to the sensor 9. As a result, the operating time of the battery 5b can be extended, and the frequency of the inspector going to the site to replace the battery can be further reduced.

Further, in some other embodiments, the control signal S may be a survival confirmation signal Sr requesting a reply of receipt confirmation. In this case, when the received control signal S is the survival confirmation signal Sr, the control unit 3 is configured to transmit the receipt confirmation to the external wireless device 81 using the above-mentioned antenna 1a. As a result, the diagnosis of the wireless tag 1 can be performed from the external wireless device 81. For example, when the detection result V of the sensor 9 is not received from the wireless tag 1, the cause can be temporarily isolated at a remote location.

In the embodiment shown in FIG. 4, the wireless tag 1 further includes a control signal receiving unit 35 configured to extract (read) the control signal S from the received radio wave or the like. For example, the bit string of the control signal S superimposed on the radio wave or the like by modulation may be extracted according to the modulation method. The control signal receiving unit 35 is then connected to the antenna 1a and the power supply control unit 31, and the control signal S is extracted from the radio wave or the like before the radio wave received by the antenna 1a is rectified, for example, by the power generation unit 2. Then, the control signal receiving unit 35 issues a command (signal) to the power supply control unit 31 in response to the extracted control signal S. When the control signal S is the survival confirmation signal Sr, a trigger signal requesting a reply is output to the transmission processing unit 33. In this case, the transmission processing unit 33 may transmit the communication information I including only the position identification information Pi.

An example of a case where the power supply to the sensor 9 is controlled according to the above-mentioned control signal S will be described as an example of a case where a radio wave is transmitted from the external wireless device 81. The mobile object 8 may be configured to transmit the radio wave at a predetermined cycle while moving along the patrol route R, or may transmit the radio wave only when it arrives at the inspection point P or approaches a predetermined distance. Further, the mobile object 8 may be configured to temporarily stop at the inspection point P if the detection result V of the sensor 9 can be acquired at the inspection point P, or may pass through the inspection point P at the current speed or, for example, by adjusting the speed.

When the mobile object 8 arrives at the inspection point P, the mobile object 8 transmits a radio wave including the start signal Ss using the external wireless device 81. When the wireless tag 1 receives the radio wave transmitted from the mobile object 8, the wireless tag 1 reads the control signal S carried with the radio wave and executes an operation corresponding to the control signal S. Here, since the control signal S is the start signal Ss, the control signal receiving unit 35 consumes a portion of the generated power E and outputs a start trigger signal corresponding to the start signal Ss to the power supply control unit 31, and then enters a standby state. In this standby state, the acquisition unit 32 is waiting for the input of the detection result V from the sensor 9.

Upon receiving the start trigger signal, the power supply control unit 31 switches on the switch 5s (closes the circuit). As a result, the power supply from the battery 5b to the sensor 9 starts. Then, the sensor 9 supplied with the power starts the measurement operation, and outputs the detection result V to the wireless tag 1 under predetermined conditions. The sensor 9 may output a signal subjected to pre-processing such as, for example, fast Fourier transform (FFT) to the wireless tag 1 as the detection result V. In the wireless tag 1, after the detection result V of the sensor 9 is received by the acquisition unit 32, the communication information I is generated from the transmission processing unit 33, and the communication information I is transmitted from the antenna 1a to the mobile object 8, for example, using the reflected wave of the radio wave from the external wireless device 81.

After that, when the mobile object 8 can acquire the communication information I, the mobile object 8 transmits the completion signal Se on the radio wave, and when the control signal receiving unit 35 receives the completion signal Se, the mobile object 8 outputs a completion trigger signal corresponding to the completion signal Se to the power supply control unit 31. In this way, the power supply control unit 31 may return from the standby state upon receiving the control signal S, or may return from the standby state when the communication information I is transmitted. Upon receiving the completion trigger signal, the power supply control unit 31 switches off the switch 5s.

As a result, the power supply from the battery 5b to the sensor 9 is stopped. If the mobile object 8 does not receive the communication information I within a predetermined time after the transmission of the start signal Ss, the mobile object 8 may transmit the start signal Ss again as described later. Further, the mobile object 8 may transmit the survival confirmation signal Sr to the wireless tag 1. On the other hand, if the mobile object 8 succeeds in receiving the communication information I, the mobile object 8 moves to the next inspection point P (sensor 9).

However, the present invention is not limited to the above-described embodiment. In some other embodiments, the control signal S may not include at least one of the start signal Ss and the completion signal Se, and the power supply to the sensor 9 may be started or stopped in response to the reception of the radio wave or the like or the exhaustion of the generated power E based on the radio wave or the like.

According to the above-mentioned configuration, the control unit 3 is configured to execute processing according to the control signal S obtained based on the received radio wave or the like. As a result, the wireless tag can be operated in response to an external command.

Further, in some other embodiments, the power supply control unit 31 may stop the power supply to the sensor 9, for example, by switching off the switch 5s when a predetermined end condition is satisfied. The end condition may include at least one of the conditions that the wireless tag 1 receives the above-mentioned completion signal Se and that the elapsed time from the time when the power supply is started, such as when the switch 5s is switched on, exceeds a specified time.

According to the above-mentioned configuration, the power supply control unit 31 stops the power supply to the sensor 9 when a predetermined end condition is satisfied. As a result, it is possible to prevent the power supply to the sensor 9 from being unnecessarily performed, and if the battery 5b is provided, the operating time thereof can be extended.

In some other embodiments, the external wireless device 81 described above may be configured to retransmit the radio wave or the magnetic field if the communication information is not received within a specified time after the transmission of the radio wave or the magnetic field.

According to the above-mentioned configuration, the external wireless device 81 is configured to repeatedly transmit the radio wave or the like to the same wireless tag 1 when the communication information from the wireless tag is not received. As a result, it is possible to more reliably collect the detection result of the sensor by preventing the detection result from not being obtained due to the temporary deterioration of the communication environment.

Next, some embodiments of the above-mentioned inspection system 7 will be described with reference to FIG. 5.

Figure 5:
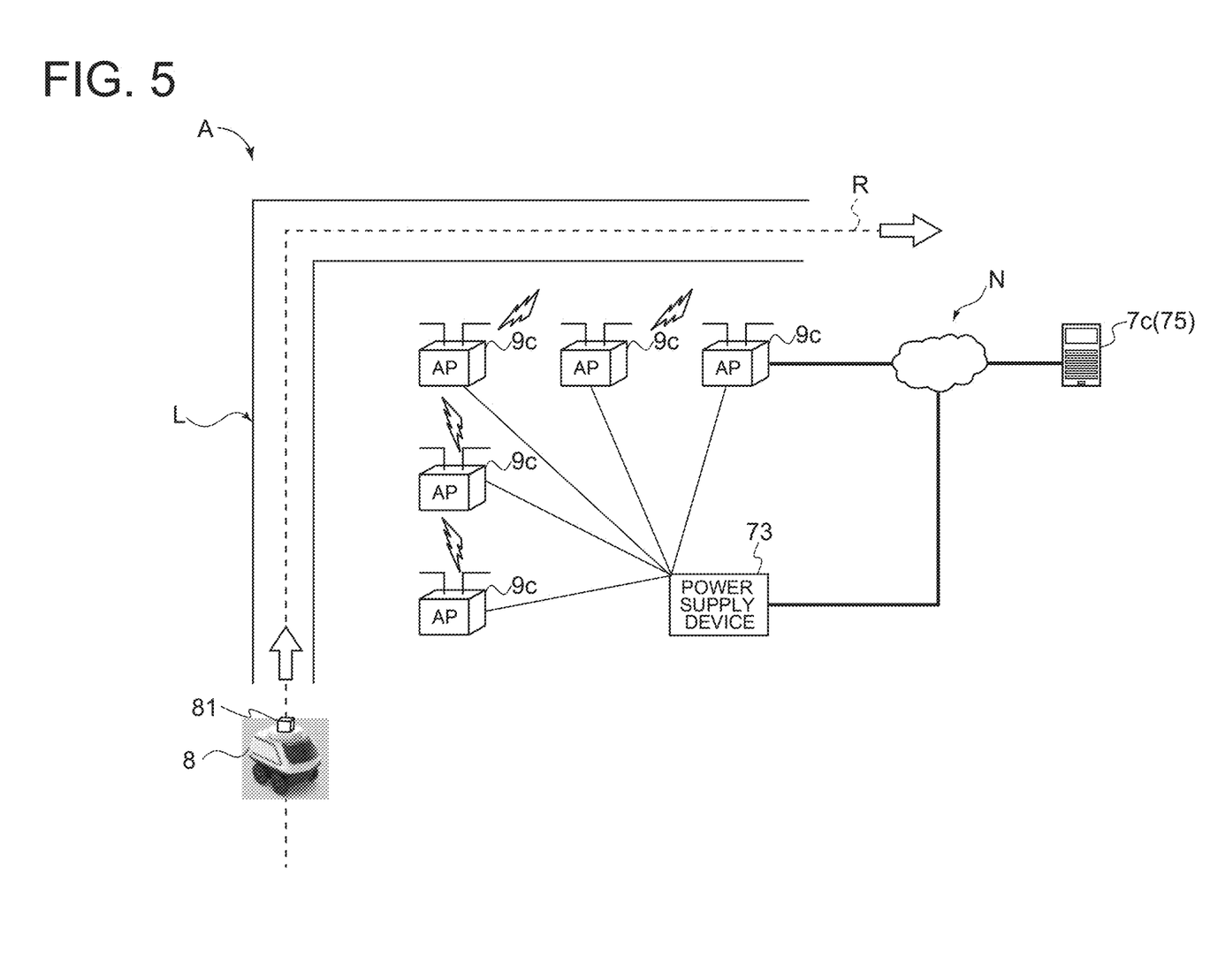
FIG. 5 is a diagram schematically showing an inspection system including a power supply control device according to an embodiment of the present invention, in which the power supply control device is a control device.
Figure 6:
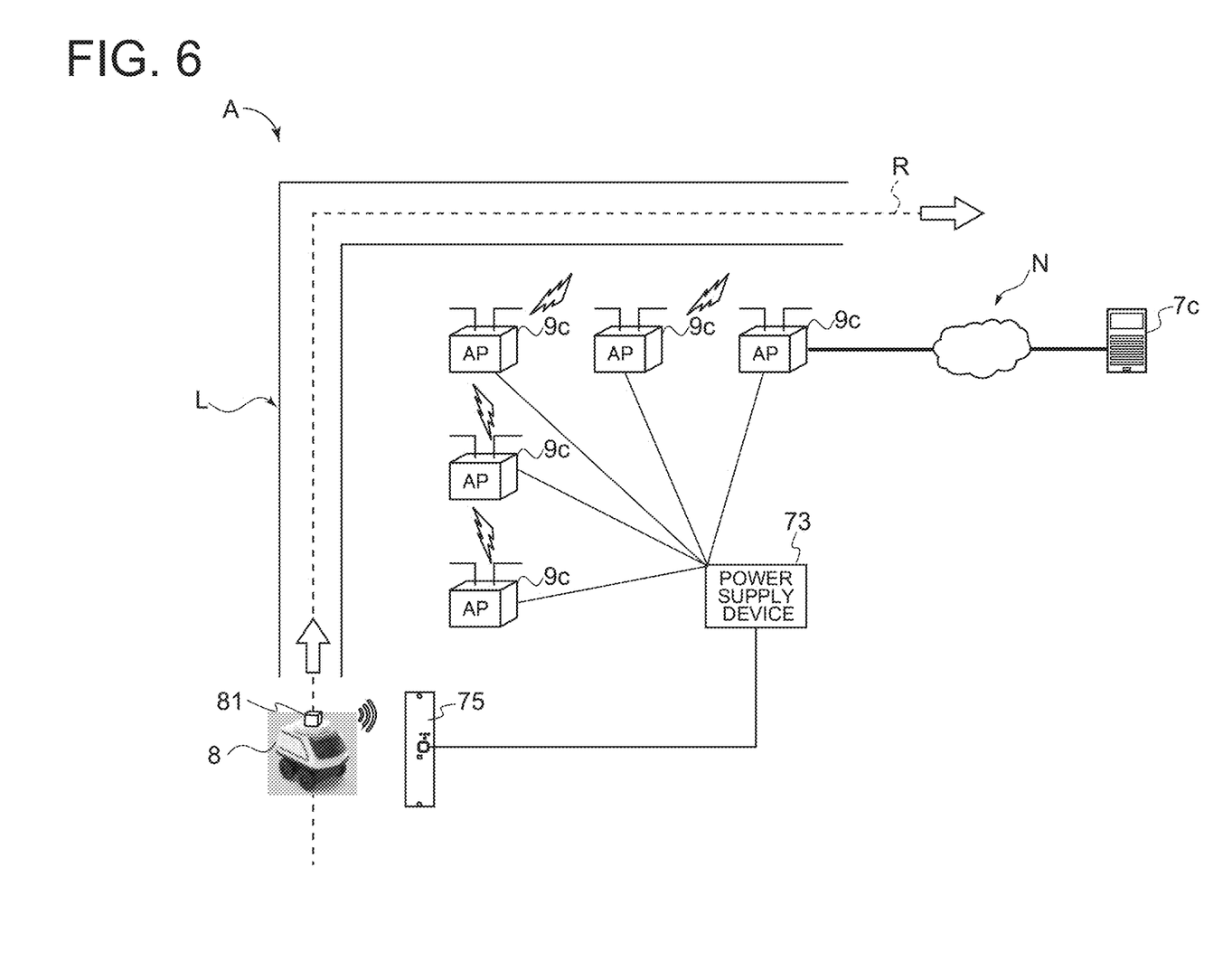
FIG. 6 is a diagram schematically showing an inspection system including a power supply control device according to an embodiment of the present invention, in which the power supply control device is a wireless tag.

FIG. 5 is a diagram schematically showing an inspection system 7 including a power supply control device 75 according to an embodiment of the present invention, in which the power supply control device 75 is the control device 7c. FIG. 6 is a diagram schematically showing an inspection system 7 including a power supply control device 75 according to an embodiment of the present invention, in which the power supply control device 75 is a wireless tag for power supply control.

For example, a base station 9b is installed at one or more positions in a target area such as a plant, and is used for the mobile object 8 moving along the patrol route R to communicate with the control device 7c. By connecting such a base station 9b (wireless AP or the like) to a power supply facility, for example, the base station 9b is always operated in the power-on state, and can be used for communication for various other purposes.

However, within the above-mentioned target area, for example, a place (hereinafter an out-of-service area A) such as a place that is not in the service area of the base station 9b, where it is difficult for the radio wave transmitted from the base station 9b to reach, and wireless communication with the base station 9b is not possible may exist. When the patrol route R is set to pass through the out-of-service area A, the mobile object 8 cannot communicate with the control device 7c when moving through the out-of-service area A. In such a case, a new base station 9b may be added so that the out-of-service area A does not occur on the patrol route R, but it is not easy when the power supply facility is not nearby. It is conceivable to use a battery, but if it is necessary to add a plurality of base stations 9b, the introduction cost and the maintenance cost will increase. Further, even if a power cable is laid between the power supply facility and the base station 9b, when such an out-of-service area A is a place where there is no need for wireless communication other than the communication between the mobile object 8 and the control device 7c, if the power of the base station 9b is always turned on, energy will be wasted.

Therefore, in some embodiments, as shown in FIG. 5, the inspection system 7 may further include a power supply device 73 such as a battery or power supply facilities, one or more base stations 9b (hereinafter, an auxiliary base station 9c) operated by the power supplied from the power supply device 73, and a power supply control device 75 for controlling the presence and absence of the power supply from the power supply device 73 to one or more auxiliary base stations 9c. Then, the power supply control device 75 is configured to control the presence and absence of the power supply from the power supply device 73 to the auxiliary base station 9c based on the distance between the mobile object 8 and one or more auxiliary base stations 9c. The number of auxiliary base stations 9c may be determined according to the size of one out-of-service area A, and when a plurality of auxiliary base stations 9c are installed, the communication between the mobile object 8 and the control device 7c may be transmitted by wireless multi-hop.

Specifically, in some embodiments, the map information described above may include information on the out-of-service area A, and as shown in FIG. 5, the power supply control device 75 may control the power supply device 73 based on the map information of the target area and the current position of the mobile object 8 and control the presence or absence of the power supply to the auxiliary base station 9c. In this case, the power supply control device 75 may be the above-mentioned control device 7c. In other words, the control device 7c may have the function of the power supply control device 75.

That is, the power supply control device 75 (control device 7c) can grasp the current position of the mobile object 8. Therefore, on the premise that the map information includes the information of the out-of-service area A, the power supply control device 75 may control the power supply to the auxiliary base station 9c by controlling the power supply device 73 at a predetermined timing before or after the current position of the mobile object 8 enters the out-of-service area A. As a result, the out-of-service area A on the patrol route R can be eliminated when the mobile object 8 passes. Further, when the mobile object 8 leaves the out-of-service area A in the map information, the power supply to the auxiliary base station 9c may be stopped by controlling the power supply device 73. As a result, it is possible to prevent wasting of power when the mobile object 8 is not present.

In some other embodiments, the power supply control device 75 may control the power supply device 73 based on the travel time of the mobile object 8 to control the presence or absence of the power supply to the auxiliary base station 9c (see FIG. 5). For example, when the mobile object 8 departs from a reference position such as a specified hangar and patrols the patrol route R, it is possible to predict the elapsed time (arrival time) until the mobile object 8 arrives at the out-of-service area A after starting movement and the elapsed time (passing time) until the mobile object 8 leaves the out-of-service area A. Therefore, the elapsed time (on time) for turning on the power of the auxiliary base station 9c and the elapsed time (off time) for turning off the power are determined in advance according to the predicted arrival time or passing time. Then, the power supply control device 75 may start the power supply from the power supply device 73 to the auxiliary base station 9c at the above-mentioned on time, and stop the power supply from the power supply device 73 to the auxiliary base station 9c after continuing the power supply until the above-mentioned off time. In the case of this embodiment, the power supply control device 75 may be the control device 7c described above, but when the time when the mobile object 8 leaves the hangar is determined, the power supply control device 75 installed in the power supply device 73 may be operated by a timer.

In some other embodiments, as shown in FIG. 6, the power supply control device 75 may include the above-mentioned antenna 1a, power generation unit 2, and control unit 3. That is, the power supply control device 75 of this embodiment is a wireless tag for power supply control. In this case, the control unit 3 only needs to include the power supply control unit 31, and is configured to control the power supply device 73 using the generated power E, which is the power supplied from the power generation unit 2. Further, the power supply control device 75 is installed on the entrance side or the exit side of the out-of-service area A. Then, when the mobile object 8 approaches the receivable range of radio wave or the like, the power supply control device 75 starts the power supply from the power supply device 73 to the auxiliary base station 9c, and stops the power supply when the above-mentioned end condition is satisfied. Further, the control unit 3 may further include the control signal receiving unit 35 described above, and may control the power supply device 73 upon receiving the start signal Ss and the completion signal Se. In this way, the power control device 75 and the auxiliary base station 9c can be turned on using RFID or the like. Further, the auxiliary base station 9c can be turned on only when the mobile object 8 is inside or near the out-of-service area A.

As shown in FIGS. 5 to 6, when a plurality of auxiliary base stations 9c exist, one power supply device 73 may be configured to supply power to two or more of the auxiliary base stations 9c. In this case, when the one power supply device 73 is activated, the plurality of auxiliary base stations 9c are activated, so that transmission by wireless multi-hop can be smoothly started.

In the embodiment shown in FIG. 5, a case where the patrol route R is set along the travel road L, and the mobile object 8 is moving to the vicinity of the communication area A is illustrated. A plurality of (five in FIG. 5) auxiliary base stations 9c are installed in this out-of-service area A, and the communication data received by a certain auxiliary base station 9c is transmitted by wireless multi-hop to the auxiliary base station 9c connected to the communication network N and is transmitted therefrom to the control device 7c. Further, the communication data transmitted from the control device 7c can be transmitted to the mobile object 8 via one or more auxiliary base stations 9c.

The power supply device 73 is connected to all of the plurality of auxiliary base stations 9c installed in the out-of-service area A, and power can be supplied. Further, the power supply device 73 can communicate with the power supply control device 75 by being connected to the communication network. Then, when the power supply device 73 starts the power supply to the auxiliary base station 9c upon receiving a command from the power supply control device 75 (the control device 7c in FIG. 5) to start the power supply to the auxiliary base station 9c and stops the power supply to the auxiliary base station 9c upon receiving the command to stop the power supply.

Further, in the embodiment shown in FIG. 6, the power supply control device 75 using RFID may be installed in the vicinity of the entrance of the out-of-service area A and within the range where wireless communication by RFID is possible from a predetermined position of the patrol route R. In this case, the power supply control device 75 may output, for example, a start trigger signal to the power supply device 73 when the RFID communication is performed with the mobile object 8. The power supply device 73 may stop the power supply to the auxiliary base station 9c after a predetermined time such as the time required for the mobile object 8 to leave the out-of-service area A has elapsed from the reception time of the start trigger signal or the like. Alternatively, the power supply control device 75 using RFID may also be installed on the exit side of the out-of-service area A, and when the completion signal Se is received from the mobile object 8, a completion trigger signal may be transmitted to the power supply device 73. Upon receiving the completion trigger signal, the power supply device 73 stops the power supply to the auxiliary base station 9c.

According to the above-mentioned configuration, the auxiliary base station 9c, which is, for example, a wireless access point (AP), is installed in the out-of-service area A, and the presence or absence of the power supply to the auxiliary base station 9c is controlled based on the distance between the mobile object 8 and the auxiliary base station 9c. As a result, the power supply to the auxiliary base station 9c can be executed only when the mobile object 8 exists in or near the out-of-service area A, and the power consumption in the auxiliary base station 9c can be reduced.

The present invention is not limited to the above-described embodiment, and includes a modification of the above-mentioned embodiment and a combination of these embodiments as appropriate.

ADDITIONAL NOTE (1) A wireless tag for sensor control (1) according to at least one embodiment of the present invention is a wireless tag for sensor control (1) that is connected to a sensor (9) and configured to control execution of measurements using the sensor (9), including: an antenna (1a) for receiving a radio wave or a magnetic field transmitted from an external wireless device (81); a power generation unit (2) configured to generate electric power based on the radio wave or the magnetic field received by the antenna (1a); and a control unit (3) configured to control the sensor (9) using generated power (E), which is the electric power supplied from the power generation unit (2), wherein the control unit (3) includes: a power supply control unit (31) configured to use a portion of the generated power (E) to execute power supply to the sensor (9); an acquisition unit (32) configured to receive a detection result (V) from the sensor (9) operated by the execution of the power supply; and a transmission processing unit (33) configured to transmit communication information (I) including the detection result (V) to the outside.

According to the configuration of (1), the wireless tag for sensor control (1) generates electric power by receiving the radio wave or the like from the external wireless device (81) such as an RFID tag reader and writer, and executes the power supply to the sensor (9) installed in, for example, a plant, using a portion of the power. Further, the detection result (V) obtained by the sensor (9) operating with this power supply is acquired, and for example, the communication information (I) is communicated to a host device (the control device (7c) or the like in FIG. 1) via, for example, the above-mentioned external wireless device (81), a wireless LAN, or the base station (9b) of the mobile communication system. That is, power is supplied to the sensor (9) using RFID, the sensor (9) is powered on and activated (operated), and the detection result V of the sensor (9) is wirelessly transmitted to the outside.

In this way, by turning on the wireless tag for sensor control (1) and the sensor (9) using RFID or the like, the power supply to the wireless tag for sensor control (1) and the sensor (9) can be performed without installing the battery (5b) or power supply facilities (cable laying, and the like). Therefore, it is possible to reduce these installation costs and maintenance costs such as replacement of the battery (5b).

Further, by wirelessly communicating the detection result (V) of the sensor (9) from the wireless tag for sensor control (1) to the outside, for example, it is easy to inspect a position such as a high place or the upper surface of piping that cannot be reached by a ground-traveling robot or becomes a blind spot. In addition, by acquiring the detection result (V) of the sensor (9) installed in advance by wireless communication, an inspection operation can be performed without using expensive facilities such as a high-performance manipulator or advanced control such as camera alignment. Further, if the position identification information (Pi) is included in the communication information (I) transmitted from the wireless tag for sensor control (1) to the outside together with the detection result (V) of the sensor (9), the inspection point (P) and the detection result (V) of the sensor (9) can be linked more reliably.

(2) In some embodiments, in the configuration of (1), the transmission processing unit (33) is configured to transmit the communication information (I) to the external wireless device (81) using the antenna (1a).

According to the configuration of (2), the wireless tag for sensor control (1) transmits the detection result (V) of the sensor (9) to the external wireless device (81). As a result, the RFID can be used to perform operations ranging from the detection by the sensor (9) to the acquisition of the detection result (V) by the external wireless device (81). For example, when the detection result (V) is transmitted from the wireless tag for sensor control (1) to a collection device via another network such as the base station (9b), the wireless tag for sensor control (1) may require a function to communicate with the station (9b) or a power supply for operating the function. However, the detection result (V) can be transmitted to the outside (the external wireless device (81)) without preparing such a function, a power supply, and the like.

(3) In some embodiments, in the configurations (1) to (2), the control unit (3) is configured to perform processing according to a control signal (S) obtained based on the received radio wave or the magnetic field.

According to the configuration of (3), the wireless tag for sensor control (1) executes processing according to the received control signal (S). In this way, the wireless tag for sensor control (1) can be operated in response to an external command, and the wireless tag for sensor control (1) capable of flexibly coping with various demands can be provided.

(4) In some embodiments, in the configuration of (3), the sensor (9) is connected to a battery (5b) via a switch (5s) that can switch the presence or absence of the power supply to the sensor (9), and the power supply control unit (31) is configured to switch on the switch (5s) in order to supply the power of the battery (5b) to the sensor (9).

For example, in a configuration in which the power that can be generated using a passive RFID tag (the wireless tag (1)) is not large, and a portion of the power is directly supplied to the sensor (9), it may not be possible to drive the sensor (9) that consumes a large amount of power. Further, even with the sensor (9) having low power consumption, it may be difficult to perform detection such as measurement of vibration (acceleration), distortion, and the like, or transmission of image data at a high sampling frequency with low power.

According to the configuration of (4), the sensor (9) is activated using the electric power of the battery (5b). Then, the power supply control unit (31) uses a portion of the electric power generated based on the radio wave or the like received from the external wireless device (81) to turn on the switch (5s) provided in the power line (5L) connecting the sensor (9) and the battery (5b). As a result, when the wireless tag for sensor control (1) receives the radio wave or the like received from the external wireless device (81), power supply to the sensor (9) can be executed using the battery (5b). As a result, even when the power consumption of the sensor (9) is large or the detection (measurement) with a high sampling frequency is required, the measurement by the sensor (9) can be appropriately executed.

Further, since the electric power stored in the battery (5b) is used only when the radio wave or the like is received from the external wireless device (81), the consumption of the electric power of the battery (5b) can be suppressed, and the operating time of the battery (5b) can be extended. At this time, if the wireless tag for sensor control (1) is completely passively driven, standby power is not required, so that the wireless tag for sensor control (1) can be operated without using the power of the battery (5b). Therefore, the operating time of the battery (5b) can be further extended.

(5) In some embodiments, in the configuration of (4), the control signal (S) includes a start signal (Ss) instructing the start of power supply to the sensor (9), and the power supply control unit (31) is configured to switch on the switch (5s) when the control signal (S) is the start signal (Ss).

According to the configuration of (5), the wireless tag for sensor control (1) is configured to execute (start) the power supply to the sensor (9) in response to the reception of the start signal (Ss) transmitted from the external wireless device (81). As a result, the power supply to the sensor (9) can be executed in response to an external command.

(6) In some embodiments, in the configurations (4) to (5), the control signal (S) includes a completion signal (Se) instructing the stop of power supply to the sensor (9), and the power supply control unit (31) is configured to switch off the switch (5s) when the control signal (S) is the completion signal (Se).

According to the configuration of (6), the wireless tag for sensor control (1) is configured to stop the power supply to the sensor (9) in response to the reception of the completion signal (Se) transmitted from the external wireless device (81). As a result, the power supply to the sensor (9) can be stopped in response to an external command, and the power of the battery (5b) can be prevented from being consumed unnecessarily while allowing the wireless tag for sensor control (1) to continue to operate when the power supply to the sensor (9) is unnecessary.

(7) In some embodiments, in the configurations (4) to (6), the control signal (S) includes a charge execution signal (Sb) instructing the power supply to the battery (5b), and the power supply control unit (31) is configured to supply a portion of the generated power (E) to the battery (5b) when the received control signal (S) is the charge execution signal (Sb).

According to the configuration of (7), the wireless tag for sensor control (1) is configured to charge the battery (5b) with the generated power in response to the reception of the charge execution signal (Sb) transmitted from the external wireless device (81). As a result, the operating time of the battery (5b) can be extended, and the frequency of the inspector going to the site to replace the battery (5b) can be further reduced.

(8) In some embodiments, in the configurations (4) to (7), the control signal (S) includes a survival confirmation signal (Sr) requesting a reply of a receipt confirmation, and the control unit (3) is configured to transmit the receipt confirmation to the external wireless device (81) using the antenna (1a) when the received control signal (S) is the survival confirmation signal (Sr).

According to the configuration of (8), the wireless tag for sensor control (1) is configured to transmit a receipt confirmation (response signal) in response to the reception of the survival confirmation signal (Sr) transmitted from the external wireless device (81). As a result, the diagnosis of the wireless tag for sensor control (1) can be performed from the external wireless device (81). For example, when the detection result (V) of the sensor (9) is not received from the wireless tag for sensor control (1), the cause can be temporarily isolated at a remote location.

(9) In some embodiments, in the configurations (1) to (8), the communication information (I) further includes position identification information (Pi) used for identifying an installation position of the sensor.

For example, when a large number of sensors (9) are installed in a plant and the installation positions of two or more sensors (9) are close to each other, for example, if the sensor (9) and the detection result (V) thereof are linked based on the position information of the mobile object (8) equipped with the external wireless device (81), there is a risk that the sensor (9) and the detection result (V) of the sensor (9) cannot be linked correctly depending on the position estimation accuracy (10 cm to several m).

According to the configuration of (9), the detection result (V) of the sensor (9) and the position identification information (Pi) of the sensor (9) are transmitted from the wireless tag for sensor control (1) in a linked state. As a result, the sensor (9) and the detection result (V) of the sensor (9) can be appropriately linked with each other.

(10) An inspection system (7) according to at least one embodiment of the present invention includes one or more wireless tags (1) for sensor control according to any one of (1) to (9); an external wireless device (81) for transmitting a radio wave or a magnetic field to the one or more wireless tags (1) for sensor control and receiving communication information (I) transmitted from the one or more wireless tags (1) for sensor control; and a mobile object equipped with the external wireless device (81).

According to the configuration of (10), the power supply to the sensor (9) and the external transmission of the detection result (V) of the sensor (9) are executed only when the mobile object (8) is within a range in which the radio wave or the like from the external wireless device (81) included in the mobile object (8) can be received by the wireless tag for sensor control (1). As a result, by moving the mobile object (8) to the inspection point (P) near various sensors (9) installed in the target area such as in the plant, the power supply to the sensor (9) and the collection of the detection result (V) of the sensor (9) can be executed even if the sensor (9) does not have the power supply device (73). Further, even when there are several hundreds of inspection points (P), the risk of crosstalk and data loss is low because the measurement is performed at one point to several points in order. Moreover, the same effects as the above-mentioned (1) to (9) are obtained.

(11) In some embodiments, in the configuration of (10), the wireless tag for sensor control further include: a power supply device (73); one or more auxiliary base stations (9c) operated by electric power supplied from the power supply device (73); and a power supply control device (75) for controlling presence or absence of the power supply from the power supply device (73) to the one or more auxiliary base stations (9c), wherein the power supply control device (75) is configured to control the presence or absence of the power supply from the power supply device (73) to the auxiliary base station (9c) based on a distance between the mobile object (8) and the one or more auxiliary base stations (9c).

According to the configuration of (11), the presence or absence of the power supply to the auxiliary base station (9c), which is, for example, a wireless access point (AP), is controlled based on the distance between the mobile object (8) and the auxiliary base station (9c). As a result, the power consumption in the auxiliary base station (9c) can be reduced by executing the power supply to the auxiliary base station (9c) only when the mobile object (8) approaches the auxiliary base station (9c).

For example, when the detection result (V) of the sensor (9) collected by the mobile object (8) is transmitted from the mobile object (8) to a host (a collecting device and the like) via a wireless network such as Wi-Fi or a mobile object (8) communication network, there may be a case where the wireless tag for sensor control (1) cannot communicate with the auxiliary base station (9c) of these wireless networks depending on the position where the wireless tag for sensor control (1) is installed. When the auxiliary base station (9c) is installed for an area where the communication environment is poor, the power consumption in the auxiliary base station (9c) can be reduced by executing the power supply from the power supply device (73) such as the battery (5b), for example, to the auxiliary base station (9c) according to the distance to the mobile object (8). Further, when the auxiliary base station (9c) is driven by the battery (5b), the consumption of the battery (5b) can be suppressed, so that the auxiliary base station (9c) can be driven for a long period of time without replacement. Therefore, it is possible to operate the auxiliary base station (9c) without laying a power supply facility for the auxiliary base station (9c).

(12) In some embodiments, in the configurations (10) to (11), the external wireless device (81) is configured to retransmit the radio wave or the magnetic field if the communication information is not received even after a lapse of a predetermined time after the radio wave or the magnetic field is transmitted.

According to the configuration of (12), the external wireless device (81) is configured to repeatedly execute the transmission of the radio wave or the like to the same wireless tag for sensor control (1) when the communication information (I) is not received from the wireless tag for sensor control (1). By doing so, the detection result (V) of the sensor (9) can be collected more reliably by preventing the detection result (V) from not being obtained due to the temporary deterioration of the communication environment.

(13) A mobile object (8) according to at least one embodiment of the present invention is equipped with an external wireless device (81) for transmitting a radio wave or a magnetic field to the wireless tag for sensor control (1) according to any one of (1) to (9) and receiving communication information (I) transmitted from the wireless tag for sensor control (1).

According to the configuration of (13), the same effects as the above-mentioned (1) to (9) are obtained.

REFERENCE SIGNS LIST

1 Wireless tag (wireless tag for sensor control)
1a Antenna
2 Power generation unit
3 Control unit
31 Power supply control unit
32 Acquisition unit
33 Transmission processing unit
34 Power distribution unit
35 Control signal receiving unit
3m Storage unit
5L Power line
5b Battery
5s Switch
7 Inspection system
7c Control device
73 Power supply device
75 Power supply control device
8 Mobile object
81 External wireless device
9 Sensor
9b Base station
9c Auxiliary base station
91 Sensor main body
92 Converter
R Patrol route
L Travel road
P Inspection point
E Generated power
V Detection result
I Communication information
Pi Position identification information
N Communication network
A Out-of-service area
S Control signal
Ss Start signal
Se Completion signal
Sb Charge execution signal
Sr Survival confirmation signal

The invention claimed is:

1. A wireless tag for sensor control that is connected to a sensor and configured to control execution of measurements using the sensor, comprising:

an antenna for receiving a radio wave or a magnetic field transmitted from an external wireless device;

a power generation unit configured to generate electric power based on the radio wave or the magnetic field received by the antenna; and a control unit configured to control the sensor using generated power, which is the electric power supplied from the power generation unit, wherein the control unit includes:

a power supply control unit configured to use a portion of the generated power to execute power supply to the sensor;

an acquisition unit configured to receive a detection result from the sensor operated by the execution of the power supply; and a transmission processing unit configured to transmit communication information including the detection result to the outside, wherein the control unit is configured to perform processing according to a control signal obtained based on the received radio wave or the magnetic field, the sensor is connected to a battery via a switch that can switch presence or absence of the power supply to the sensor, the power supply control unit is configured to switch on the switch in order to supply the power of the battery to the sensor, the control signal includes a survival confirmation signal requesting a reply of a receipt confirmation, and the control unit is configured to transmit the receipt confirmation to the external wireless device using the antenna when the received control signal is the survival confirmation signal.

2. The wireless tag for sensor control according to claim 1, wherein the transmission processing unit is configured to transmit the communication information to the external wireless device using the antenna.

3. The wireless tag for sensor control according to claim 1, wherein the control signal includes a start signal instructing the start of power supply to the sensor, and the power supply control unit is configured to switch on the switch when the control signal is the start signal.

4. The wireless tag for sensor control according to claim 1, wherein the control signal includes a completion signal instructing the stop of power supply to the sensor, and the power supply control unit is configured to switch off the switch when the control signal is the completion signal.

5. The wireless tag for sensor control according to claim 1, wherein the control signal includes a charge execution signal instructing the power supply to the battery, and the power supply control unit is configured to supply a portion of the generated power to the battery when the received control signal is the charge execution signal.

6. The wireless tag for sensor control according to claim 1, wherein the communication information further includes position identification information used for identifying an installation position of the sensor.

7. An inspection system, comprising:

one or more wireless tags for sensor control according to claim 1;

an external wireless device for transmitting a radio wave or a magnetic field to the one or more wireless tags for sensor control and receiving communication information transmitted from the one or more wireless tags for sensor control;

a mobile object equipped with the external wireless device;

a power supply device;

one or more auxiliary base stations operated by electric power supplied from the power supply device; and a power supply control device for controlling presence or absence of the power supply from the power supply device to the one or more auxiliary base stations, wherein the power supply control device is configured to control the presence or absence of the power supply from the power supply device to the one or more auxiliary base stations based on a distance between the mobile object and the one or more auxiliary base stations.

8. An inspection system comprising:

one or more wireless tags for sensor control according to claim 1;

an external wireless device for transmitting a radio wave or a magnetic field to the one or more wireless tags for sensor control and receiving communication information transmitted from the one or more wireless tags for sensor control; and a mobile object equipped with the external wireless device, wherein the external wireless device is configured to retransmit the radio wave or the magnetic field if the communication information is not received even after a lapse of a predetermined time after the radio wave or the magnetic field is transmitted.

9. A mobile object, equipped with an external wireless device for transmitting a radio wave or a magnetic field to the wireless tag for sensor control according to claim 1 and receiving communication information transmitted from the wireless tag for sensor control.

* * * * *